United States Patent [19]

Dickson et al.

[11] Patent Number: 4,897,779
[45] Date of Patent: Jan. 30, 1990

[54] METHOD AND APPARATUS FOR OPTIMIZING INTER-PROCESSOR INSTRUCTION TRANSFERS

[75] Inventors: Robert Dickson, Arlington; W. Hugh Durdan, Waban; George M. Uhler, Marlborough, all of Mass.

[73] Assignee: Digital Equipment Corporation, Maynard, Mass.

[21] Appl. No.: 221,987

[22] Filed: Jul. 20, 1988

[51] Int. Cl.$^4$ ............................................. G06F 15/16
[52] U.S. Cl. .................................... 364/200; 364/228; 364/228.3; 364/229; 364/229.1; 364/232.21; 364/240.8; 364/240.9
[58] Field of Search ....................... 364/200, 300, 900

[56] References Cited

U.S. PATENT DOCUMENTS 4,346,437  8/1982  Blahut et al. ....................... 364/200
4,562,533 12/1985  Hodel et al. ........................ 364/200

OTHER PUBLICATIONS

"80387SX 80-Bit Numeric Processor Extension", Data Sheet Published by Intel Corporation, May 1988, pp. 1 and 16-26.
James P. Gray, "Line Control Procedures", Proceedings of the IEEE, vol. 60, pp. 1301-1312, Nov. 1972.
Mishra, "The VAX 8800 Microarchitecture", Digital Technical Journal, Feb. 1987, pp. 20-33.

Primary Examiner—Raulfe B. Zache
Attorney, Agent, or Firm—Arnold, White & Durkee

[57] ABSTRACT

A protocol for transferring instructions between asynchronous processors in a computer system is provided. Each instruction transfer requires the transfer of an opcode and a variable number of operands. The transfer is accomplished via a bus which interconnects the processors. The opcode and operands are assembled in a buffer in the sending processor and then transferred to the receiving processor in reverse order, i.e., operands first and opcode last. The receiving processor does not acknowledge any of the transfers until it receives the opcode which is always sent last. Upon receipt of the opcode, the receiving processor knows the instruction transfer is complete and sends the acknowledge signal immediately thereafter.

23 Claims, 3 Drawing Sheets

METHOD AND APPARATUS FOR OPTIMIZING INTER-PROCESSOR INSTRUCTION TRANSFERS

RELATED APPLICATIONS

This invention is related to the following application, which is assigned to the assignee of the present invention and concurrently filed herewith in the names of the inventors of the present invention:

An Efficient Protocol for Communicating Between Asynchronous Devices, Serial No. 221,920.

FIELD OF THE INVENTION

The present invention relates generally to a method and apparatus for transferring data between asynchronous processing units in a computer system, and more particularly relates to a method and apparatus for reducing the time required for inter-processor transfers of machine language instructions.

BACKGROUND OF THE INVENTION

Since the first computer was built, computer engineers have searched for ways to increase the speed and power of computer systems. One method that is now being used for improving system performance is to utilize multiple processors in a single system. In such a system, there is typically a master or primary processor which performs certain processing tasks and sends other processing tasks to the slaves or coprocessors. The processors typically operate asynchronously. An example of such a system is a multi-processor system utilizing a scalar processor as the primary processor and a vector processor as a coprocessor. In operation of the system, the scalar processor transfers vector instructions, comprised of an opcode and a variable number of operands, to the vector processor. Since the two processors are operating asynchronously, the scalar processor continues its processing tasks while the vector processor simultaneously processes the vector instructions. This method of operation results in faster execution of a stored computer program comprised of a mix of vector and non-vector type instructions over an otherwise equivalent system employing only one processor.

However, the desired increase in operating speed and processing power of the overall system can be severely limited by the method or protocol used for inter-processor communications. The coprocessor cannot begin the execution of an instruction before it has been completely transferred. Accordingly, the primary processor must be able to transfer instructions to the coprocessor both quickly and reliably. An instruction is comprised of a set of data words which includes an opcode and a variable number of operands. The number of operands may range from zero to many. The data word containing the opcode may also contain other information, including all or part of an operand. However, as used herein, "opcode" refers to the entire data word containing the opcode and the term "operands" refers to the data words which are part of the instruction but which do not contain the opcode. Thus, a complete instruction transfer actually requires a series of transfers in most cases. This series of transfers should be accomplished at a speed which results in an increase in overall system performance. Otherwise, there is little advantage to the employment of coprocessors in the system.

Known methods of communication between asynchronous processors typically utilize parallel, "fully-handshaked" protocols over a bus interconnecting the processors. A fully-handshaked protocol requires that each processor positively acknowledge each step of every transfer on the bus. In this type of protocol, an instruction transfer is accomplished by sequentially transferring the data word containing the opcode followed by each associated operand. This is accomplished by the primary processor first asserting a strobe signal, to indicate the start of a bus transaction, and at the same time transmitting the opcode of the instruction to be transferred. When the strobe signal and opcode are received by the coprocessor, it responds with an acknowledgement signal. This signal indicates to the primary processor that the opcode has been received (or latched) by the coprocessor. Upon recognizing the acknowledgement, the primary processor deasserts the strobe. When the coprocessor recognizes the deassertion of the strobe, it deasserts the acknowledge signal. When the primary processor recognizes the deassertion of the acknowledgment signal, the handshake is complete, and the bus is available for the next transaction. This sequence of steps is repeated in order to transfer each operand associated with the previously transferred opcode until the entire instruction has been transferred.

In a system utilizing a fully-handshaked protocol for instruction transfers between asynchronous processors, each processor operates on its own time base and there is no time base for the bus. Therefore, signals asserted by one processor are not received immediately by the other processor since the signals on the bus must be held until the receiving processor's internal timing allows the signals to be latched.

Accordingly, the performance of a fully-handshaked protocol is likely to detract from overall system performance. Poor performance of this protocol results from a combination of synchronization delays incurred each time either processor transmits a signal to be received by the other processor and from the numerous transmissions which must be sent and received to complete an instruction transfer.

It would, therefore, be desirable and advantageous to employ a method of transferring instructions between asynchronous processors which is reliable and which requires only one acknowledge signal from the receiving processor for each instruction transferred regardless of the number of operands associated with the instruction.

SUMMARY OF THE INVENTION

The present invention overcomes the foregoing and other shortcomings of known protocols used in inter-processor instruction transfers through the use of a novel method and apparatus for transferring instructions between processors.

An instruction transfer requires the transfer of an opcode and zero or more operands. Known asynchronous instruction transfer protocols require an acknowledgement for each data transfer on the bus. However, by taking advantage of the fact that every instruction transfer must contain an opcode along with a variable number of additional data words, it is possible to substantially reduce the time required to transfer an instruction between asynchronous devices as compared to known asynchronous instruction transfer protocols.

This improvement is accomplished by transferring the operands and opcode in reverse order, i.e., opcode last, and only acknowledging the transfer of the opcode. Thus, if the instruction is transferred in the order of the last operand to the first operand, and then the opcode, the receiving processor always knows that the opcode is the end of the instruction transfer. Accordingly, it is only necessary to acknowledge the receipt of the opcode.

For example, where an opcode and two operands are transferred using a fully-handshaked protocol, three acknowledges are required. Using the protocol of the present invention, only one acknowledge is required, no matter how many operands are transferred. This protocol results in substantial time savings over known methods for inter-processor instruction transfers.

The above noted and other aspects of the present invention will become more apparent from a description of a preferred embodiment when read in conjunction with the accompanying drawings.

DESCRIPTION OF A PREFERRED EMBODIMENT

Figure 1:
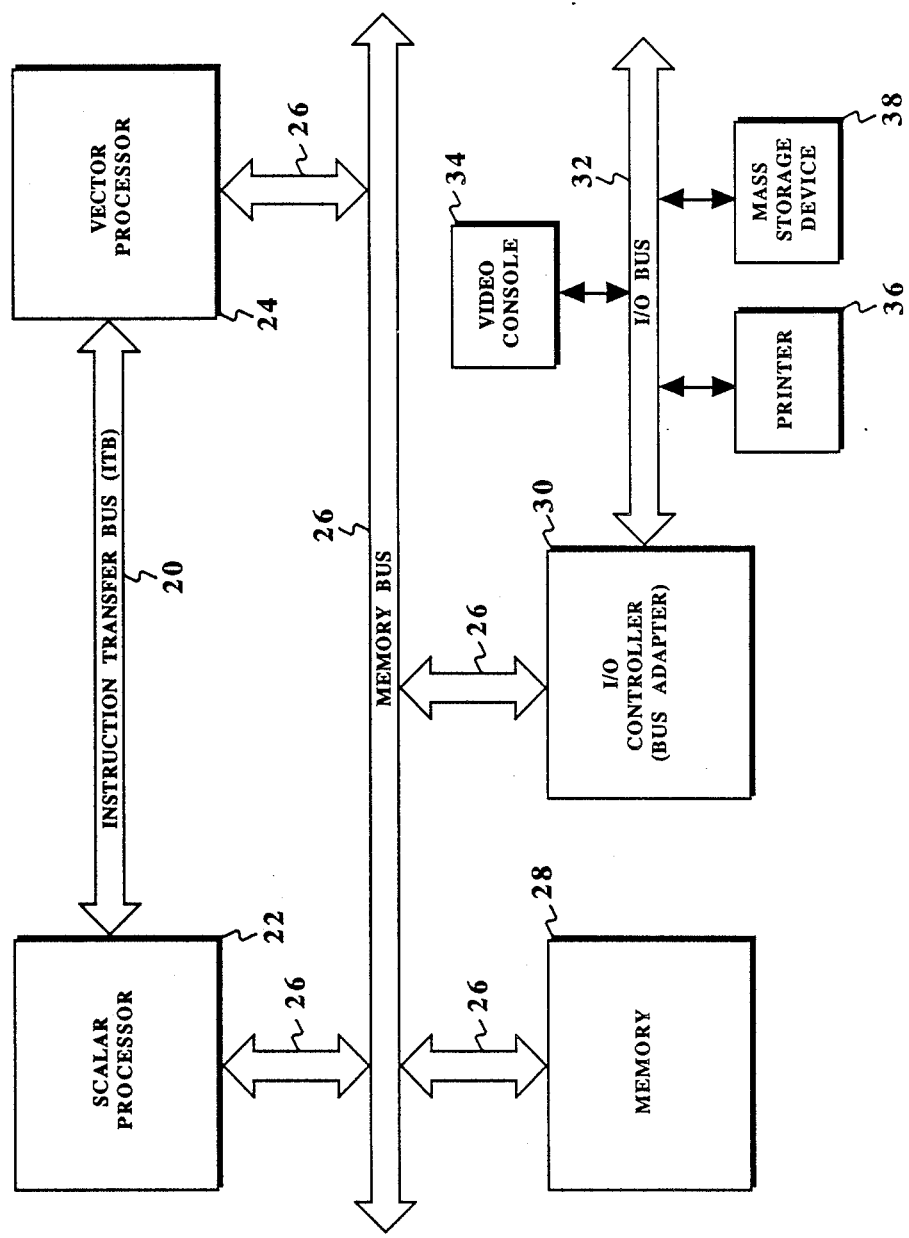
FIG. 1 is a general block diagram of a multi-processor computer system utilizing an instruction transfer bus.

Referring to FIG. 1, a general block diagram of a multi-processor computer system is shown. The system includes a primary (scalar) processor 22, a coprocessor (vector processor) 24, and an instruction transfer bus 20. Both processors are able to access main memory 28 via the system memory bus 26. In a preferred embodiment, the computer system utilizes VAX system architecture, as presently sold the by assignee of the present invention. The computer system shown in FIG. 1 also includes means for communicating with peripheral devices via an I/0 controller 30, otherwise known as a bus adapter, and an I/0 bus 32. Thus, bidirectional communication is possible with devices such as a video console 34, printer 36, and a mass storage device 38 such as a hard disk.

In operation of the system, the primary processor 22 executes a software program stored in the system's main memory 28. The program is comprised of executable machine language instructions. Each instruction is comprised of an opcode and a set of operands. Each of the opcode and operands are comprised of a plurality of bits, which in the preferred embodiment is a plurality of 32 bits (bits 0–31) herein referred to as a longword. Instructions comprised of three longwords (opcode and two operands), two longwords (opcode and one operand) or one longword (opcode and zero operands) are employed in a preferred embodiment of the invention.

In operation, the primary processor 22 and the coprocessor 24 operate asynchronously using independent time bases and are able to execute instructions simultaneously. The coprocessor 24 is designed to execute a certain class of instructions faster and more efficiently than the primary processor 22. In a preferred embodiment, the primary processor 22 is a scalar processor and the coprocessor 24 is a vector processor which is designed to execute vector instructions passed to it by the primary (scalar) processor 22. Thus, as the stored program is executed by the scalar processor 22, each instruction is decoded to first determine whether it is a vector instruction. If the next instruction to be executed is not a vector instruction, that instruction is executed by the scalar processor 22. If the next instruction to be executed is a vector instruction, that vector instruction is transferred to the vector processor 24 via the instruction transfer bus 20 for execution by the vector processor 24.

Figure 2:
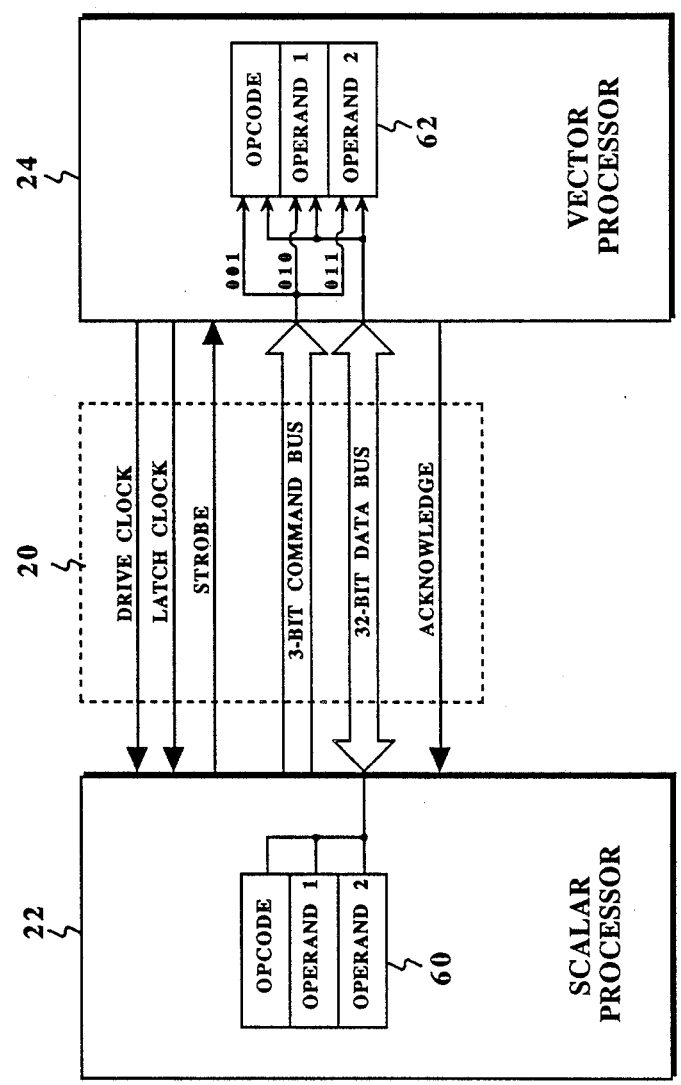
FIG. 2 illustrates the various signals utilized by the instruction transfer bus.

The instruction transfer bus (ITB) 20 is shown in greater detail in FIG. 2. The ITB 20 is implemented by a physical cable comprised of a one-bit DRIVE CLOCK line, a one-bit LATCH CLOCK line, a 32-bit DATA bus, a one-bit STROBE line, a one-bit ACKNOWLEDGE line, and a three-bit COMMAND bus. A buffer 60 is made a part of the scalar processor to enable assembly and storage of an instruction in preparation for transfer to the vector processor 24. A similar buffer 62 is made a part of the vector processor 24 to provide a temporary storage location for the opcode and each operand while the instruction is being transferred and assembled. In a preferred embodiment, each buffer 60 and 62 is large enough to accomodate a three-longword instruction.

Figure 3:
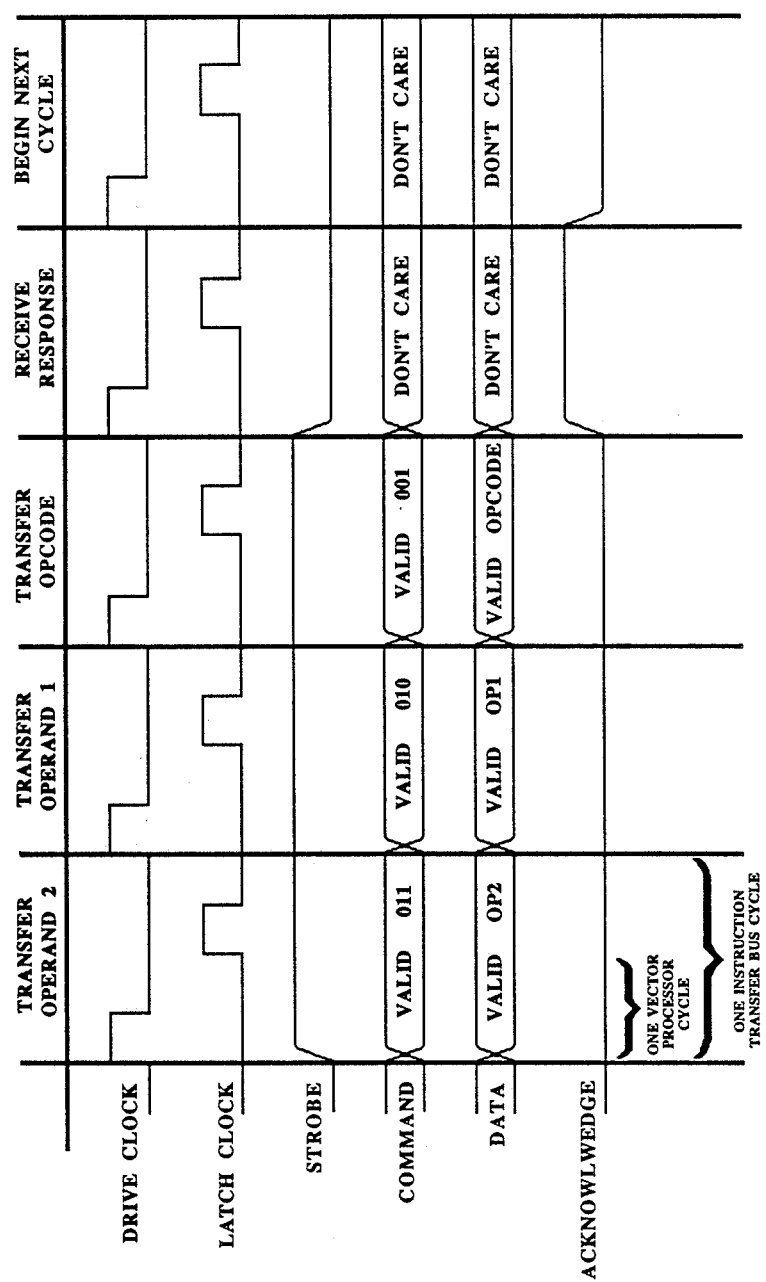
FIG. 3 is a timing diagram which illustrates the timing of an inter-processor instruction transfer.

Referring to FIGS. 2 and 3, the DRIVE CLOCK signal is generated by the vector processor 24 and all other ITB signals are initiated relative to this clock. Thus, the ITB 20 is asynchronous to the scalar processor 22, but synchronous to the vector processor 24. The start of each ITB cycle is indicated by the rising edge of a DRIVE CLOCK signal. Accordingly, the end of the current ITB cycle or "bus cycle" and the beginning of the next bus cycle is indicated by the subsequent rising edge of DRIVE CLOCK. One ITB cycle is equivalent to eight vector processor phases or two vector processor cycles. DRIVE CLOCK is asserted every other vector processor cycle for a duration of two vector processor phases. Because the scalar processor 22 initiates an instruction transfer relative to DRIVE CLOCK, the vector processor 24 may synchronously receive any signals on the ITB 20. The LATCH CLOCK signal is generated by the vector processor 24 and is asserted every other vector processor cycle, in the cycle alternate to the one in which DRIVE CLOCK is present. LATCH CLOCK is asserted for a duration of two vector processor phases. All ITB signals are received (latched) by either the vector processor 24 or the scalar processor 22 on the falling edge of the LATCH CLOCK signal.

The STROBE signal indicates the validity of the DATA and COMMAND signals. The absence of STROBE indicates an idle cycle on the ITB 20. During an instruction transfer on the ITB 20, STROBE is asserted for the cycles in which one of operand-two, operand-one, or the opcode is being transferred on the ITB 20. STROBE is generated by the scalar processor 22 synchronously with the DRIVE CLOCK signal STROBE is received by the vector processor 24 on the falling edge of LATCH CLOCK.

In a preferred embodiment, the DATA bus is a 32-bit bi-directional bus. The scalar processor 22 uses this bus to send the opcode and operands to the vector processor 24. When data is being sent to the vector processor 24, the assertion of STROBE by the scalar processor 22 indicates that the data on the DATA bus is valid in the current ITB cycle. Data on the DATA bus is generated by the scalar processor 22 synchronously with DRIVE CLOCK and received by the vector processor 24 on the falling edge of LATCH CLOCK.

The scalar processor 22 generates three-bit codes on the COMMAND bus to inform the vector processor 24 of the type of operation being done on the ITB 20. The vector processor uses this information to store the longword in the correct storage location in the instruction buffer 62. The COMMAND lines are valid in any ITB cycle in which STROBE is asserted. The following table shows the three-bit codes that are associated with the various ITB operations in a preferred embodiment.

| COMMAND | ITB Operation |
|---|---|
| 001 | Send opcode and control |
| 010 | Send operand one |
| 011 | Send operand two |

It will be understood by those skilled in the art that other command codes may be provided to direct data transfers from the vector processor 24 to the scalar processor 22.

The ACKNOWLEDGE signal is generated by the vector processor 24 to indicate a normal termination of an instruction transfer on the ITB 20. The ACKNOWLEDGE signal is only asserted after a complete instruction (the opcode and all operands) has been transferred from the scalar processor 22 to the vector processor 24 and is deasserted in the next ITB cycle. Thus, when the vector processor 24 receives the COMMAND code 001, indicating transfer of the opcode, the vector processor 24 responds by asserting ACKNOWLEDGE in the next ITB cycle. ACKNOWLEDGE is generated synchronously with DRIVE CLOCK and is received by the scalar processor 22 on the falling edge of LATCH CLOCK.

The process of transferring an instruction from the scalar processor 22 to the vector processor 24 is made up of a sequence of write operations on the ITB 20. Each instruction transfer is made up of two, one or zero operand transfers and an opcode transfer. Thus, in a preferred embodiment, a minimum of one longword and a maximum of three longwords comprise an instruction transfer. Each longword transfer requires one ITB cycle. The transfers always occur in reverse order, i.e., operand-two is sent first (if necessary), then operand-one (if necessary), then the opcode (always necessary).

A transfer operation begins after the scalar processor 22 identifies a vector instruction and places it in its instruction buffer 60 to await transfer. In the case of a three-longword instruction, a complete transfer is accomplished in four ITB cycles and comprises the following events. When the scalar processor 22 receives the next DRIVE CLOCK, signalling the beginning of an ITB cycle, the scalar processor 22 asserts STROBE, asserts the COMMAND code 011, and places operand-two on the DATA bus. On the falling edge of the next LATCH CLOCK, the vector processor 24 stores the information on the DATA bus in the operand-two portion of its addressable instruction buffer 62 based on the associated COMMAND code. STROBE remains asserted and on receipt of the next DRIVE CLOCK by the scalar processor 22, the COMMAND code 010 is asserted and operand-one is placed on the DATA bus. On the falling edge of the next LATCH CLOCK, operand-one is stored in the operand-one section of the vector processor's addressable instruction buffer 62. STROBE remains asserted and on receipt of the next DRIVE CLOCK by the scalar processor 22, the COMMAND code 001 is asserted and the opcode is placed on the DATA bus. On the falling edge of the next LATCH CLOCK, the opcode is stored in the opcode section of the vector processor's addressable instruction buffer. Sending the COMMAND code 001, i.e., the code for sending the opcode, causes the scalar processor 22 to deassert STOBE on the next DRIVE CLOCK and triggers the vector processor 24 to acknowledge receipt of a complete instruction by asserting the ACKNOWLEDGE signal. ACKNOWLEDGE is received by the scalar processor 22 on the falling edge of the next LATCH CLOCK. Once a complete instruction has been assembled in the vector processor's instruction buffer 62, the vector processor 24 moves the entire instruction to a different location within the vector processor 24 for processing. Consequently, the instruction buffer 62 is clear and ready to receive the next instruction.

Although the invention has been described with a certain degree of particularity, it is understood that the description of the preferred embodiment has been only by way of illustration. For example, any number of operands other than zero, one or two could be transferred between processors using the invention described herein by simply providing the appropriate COMMAND codes and a larger instruction transfer buffer. Also, any size DATA bus other than 32-bits could be utilized as required by the particular system architecture. Other changes and variations will be apparent to those skilled in the art without departing from the spirit and scope of the invention as claimed.

What is claimed is:

1. A method for transferring an instruction between a first processor and a second processor, said instruction comprising an opcode and a variable number of operands, comprising the steps of:
   sequentially transferring all of said variable number of operands from the first processor to the second processor;
   thereafter, transferring said opcode from the first processor to the second processor; and
   thereafter, transmitting from the second processor to the first processor a signal to acknowledge receipt of the opcode.

2. A method according to claim 1 wherein a signal is transmitted from the first processor to the second processor when the first processor is ready to transfer an instruction to the second processor.

3. A method according to claim 1 wherein a signal is transmitted from the first processor to the second processor simultaneously with each operand identifying which one of the variable number of operands is being transferred.

4. A method according to claim 3 wherein a signal is transmitted from the first processor to the second processor simultaneously with said opcode thereby indicating that said opcode is being transferred.

5. An apparatus for transferring instructions from a first processor to a second processor, said instructions each being comprised of an opcode and a variable number of operands, comprising:
   (a) means for sequentially transferring all said variable number of operands from the first processor to the second processor;
   (b) means for transferring the opcode from the first processor to the second processor after all operands have been transferred; and (c) means for transmitting a signal from the second processor to the first processor acknowledging receipt of the opcode.

6. An apparatus according to claim 5 further comprising a means for storing each of the said variable number of operands and the opcode in designated storage locations in the first processor.

7. An apparatus according to claim 5 further comprising means for storing each of the said variable number of operands and the opcode in designated storage locations in the second processor.

8. An apparatus according to claim 7 further comprising means for transmitting a code from the first processor to the second processor simultaneously with each operand identifying which one of the variable number of operands is being transferred.

9. An apparatus according to claim 8 wherein the second processor receives each operand and stores it in a specific storage location determined according to the code sent simultaneously with the operand.

10. An apparatus according to claim 7 further comprising means for transmitting a code from the first processor to the second processor simultaneously with each opcode indicating that said opcode is being transferred.

11. An apparatus according to claim 10 wherein the second processor receives the opcode and stores it in a specific storage location determined according to the code sent simultaneously with the opcode.

12. A computer system according to claim 7 further comprising means for transmitting a code from the first processor to the second processor simultaneously with each opcode indicating that said opcode is being transferred.

13. A computer system according to claim 12 wherein the second processor receives the opcode and stores it in a specific storage location determined according to the code sent simultaneously with the opcode.

14. An apparatus according to claim 5 wherein the first processor is a primary processor and the second processor is a co-processor.

15. An apparatus according to claim 14 wherein the primary processor is a scalar processor and the co-processor is a vector processor.

16. An apparatus according to claim 5 further comprising means for transmitting a signal from the first processor to the second processor when the first processor is ready to transfer an instruction to the second processor.

17. A computer system, comprising:
 (a) a first processor for transferring instructions, said instructions each comprising an opcode and a variable number of operands;
 (b) a second processor for receiving and executing said instructions;
 (c) an instruction transfer bus for interconnecting the first processor and the second processor;
 (d) means for transferring said instructions from the first processor to the second processor by sequentially sending said variable number of operands to the second processor and thereafter sending the opcode to the second processor; and
 (e) means for transmitting a signal from the second processor to the first processor acknowledging receipt of the opcode.

18. A computer system according to claim 17 further comprising means for transmitting a signal from the first processor to the second processor when the first processor is ready to transfer an instruction to the second processor.

19. A computer system according to claim 17 wherein the first processor is a primary processor and the second processor is a co-processor.

20. A computer system according to claim 19 wherein the primary processor is a scalar processor and the co-processor is vector processor.

21. A computer system according to claim 17 further comprising means for storing each of the said variable number of operands and the opcode in designated storage locations in the second processor.

22. A computer system according to claim 21 further comprising means for transmitting a code from the first processor to the second processor simultaneously with each operand identifying which one of the variable number of operands is being transferred.

23. A computer system according to claim 22 wherein the second processor receives each operand and stores it in a specific storage location determined according to the code sent simultaneously with the operand.

* * * * *

UNITED STATES PATENT AND TRADEMARK OFFICE
CERTIFICATE OF CORRECTION

PATENT NO. : 4,897,779

DATED : January 30, 1990  Page 1 of 2

INVENTOR(S) : Robert Dickson, W. Hugh Durdan, G. Michael Uhler

It is certified that error appears in the above-identified patent and that said Letters Patent is hereby corrected as shown below:

Column 7, line 31, delete "12. A computer system according to claim 7" and replace with --22. A computer system according to claim 19--.

Column 7, line 36, delete "13. A computer system according to claim 12" and replace with --23. A computer system according to claim 22--.

Column 7, line 42, delete "14" and replace with --12--.

Column 7, line 45, delete "15. An apparatus according to claim 14" and replace with --13. An apparatus according to claim 12--.

Column 8, line 1, delete "16" and replace with --14--.

Column 8, line 6, delete "17" and replace with --15--.

Column 8, line 22, delete "18. A computer system according to claim 17" and replace with --16. A computer system according to claim 15--.

Column 8, line 27, delete "19. A computer system according to claim 17" and replace with --17. A computer system according to claim 15--.

Column 8, line 30, delete "20. A computer system according to claim 19" and replace with --18. A computer system according to claim 17--.

Column 8, line 33, delete "21. A computer system according to claim 17" and replace with --19. A computer system according to claim 15--.

UNITED STATES PATENT AND TRADEMARK OFFICE
CERTIFICATE OF CORRECTION

PATENT NO. : 4,897,779

DATED : January 30, 1990

INVENTOR(S) : Robert Dickson, W. Hugh Durdan, G. Michael Uhler

It is certified that error appears in the above-identified patent and that said Letters Patent is hereby corrected as shown below:

Column 8, line 37, delete "22. A computer system according to claim 21" and replace with --20. A computer system according to claim 19--.

Column 8, line 42, delete "23. A computer system according to claim 22" and replace with --21. A computer system according to claim 20--.

Signed and Sealed this

Ninth Day of March, 1993

Attest:

STEPHEN G. KUNIN

Attesting Officer      Acting Commissioner of Patents and Trademarks